(12) United States Patent
Brown et al.

(10) Patent No.: US 7,540,328 B2
(45) Date of Patent: Jun. 2, 2009

(54) SOLID SANDSTONE DISSOLVER

(75) Inventors: J. Ernest Brown, Katy, TX (US); John W. Still, Richmond, TX (US); Diankui Fu, Missouri City, TX (US); Zhijun Xiao, Sugar Land, TX (US); Wayne Frenier, Tulsa, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/858,266

(22) Filed: Sep. 20, 2007

(65) Prior Publication Data

US 2008/0006409 A1 Jan. 10, 2008

Related U.S. Application Data

(62) Division of application No. 10/941,355, filed on Sep. 15, 2004, now abandoned.

(51) Int. Cl.
*E21B 43/27* (2006.01)
(52) U.S. Cl. .................. 166/308.1; 166/280.1
(58) Field of Classification Search .............. 166/280.1, 166/308.1
See application file for complete search history.

(56) References Cited

U.S. PATENT DOCUMENTS

| | | |
|---|---|---|
| 3,480,079 A | 11/1969 | Guinn |
| 3,481,404 A | 12/1969 | Gidley |
| 3,548,945 A | 12/1970 | Gidley |
| 3,828,854 A | 8/1974 | Templeton |
| 4,056,146 A | 11/1977 | Hall |
| 4,136,739 A | 1/1979 | Salathiel |
| 4,454,917 A | 6/1984 | Poston |
| 4,526,695 A | 7/1985 | Erbstoesser |
| 4,848,467 A | 7/1989 | Cantu |
| 4,957,165 A | 9/1990 | Cantu |
| 4,986,354 A | 1/1991 | Cantu |
| 4,986,355 A | 1/1991 | Casad |
| 5,981,447 A | 11/1999 | Chang |
| 6,207,620 B1 | 3/2001 | Gonzalez |
| 6,394,185 B1 | 5/2002 | Constien |
| 6,432,885 B1 | 8/2002 | Vollmer |
| 6,521,028 B1 | 2/2003 | Frenier |
| 6,599,863 B1 | 7/2003 | Palmer |

OTHER PUBLICATIONS

SPE 7892 Higher pH Acid Stimulation Systems—Charles C. Templeton, Albert Abrams, E.A. Richardson and Ronald F. Scheuerman.

*Primary Examiner*—David J Bagnell
*Assistant Examiner*—Nicole Coy
(74) *Attorney, Agent, or Firm*—David Cate; Robin Nava; Dale Gaudier

(57) ABSTRACT

A dry solid composition is disclosed that, when added to an aqueous liquid, provides a slurry that can be used in sandstone acid fracturing. The slurry generates hydrofluoric acid downhole to etch the sandstone fracture faces created. The chemical and physical properties of the composition result in very uneven etching of the fracture faces, enhancing the fluid conductivity of the final fracture. Optionally, inert masking materials may be included in the dry composition, or added to the slurry, to increase the inhomogeneity of the etching and further increase the fluid conductivity.

15 Claims, 5 Drawing Sheets

SOLID SANDSTONE DISSOLVER

This application is a divisional of U.S. Ser. No. 10/941,355, filed on Sep. 15, 2004 now abandoned. This application also claims the benefit of U.S. patent application Ser. No. 10/605,784, filed on Oct. 27, 2003, which claimed the benefit of U.S. Provisional Patent Application No. 60/421,696, filed on Oct. 28, 2002. This application is related to a U.S. Patent Application entitled "Selective Fracture Face Dissolution," filed on Sep. 15, 2004, inventors J. Ernest Brown, et al., and to a U.S. Patent Application entitled "Differential Etching in Acid Fracturing," filed on Sep. 15, 2004, inventors J. Ernest Brown, et al.

BACKGROUND OF THE INVENTION

The invention relates to stimulation of wells penetrating subterranean formations. In particular it relates to acid fracturing; more particularly it relates to methods of etching the fracture faces so that etching is minimal in some regions but a conductive path from the fracture tip to the wellbore is nonetheless created. Most particularly it relates to a solid additive that is added to an aqueous fluid to provide an approximately neutral pH fracturing fluid that generates downhole a sandstone-dissolving fluid that provides differential etching of fracture faces.

In acid fracturing, acid is placed in the fracture, preferably along the entire distance from the fracture tip to the wellbore, so that it reacts with the face of the fracture to etch differential flow paths that a) create disparities so that the opposing fracture faces do not match up when the fracture pressure is released and so the fracture does not close completely, and b) provide flow paths for produced fluid along the fracture faces from distant portions of the fracture to the wellbore. Normally, the acid is placed in the desired location by forming an acidic fluid on the surface and pumping the acidic fluid from the surface and down the wellbore above fracture pressure. There are generally three major problems encountered during this normal procedure.

First, in the pumping operation the acid is in contact with iron-containing components of the wellbore such as casing, liner, coiled tubing, etc. Strong acids are corrosive to such materials, especially at high temperature. This means that corrosion inhibitors must be added to the fluid being injected in order not to limit the amount of acid, and/or the time of exposure, that can be used during injection of the acid. Furthermore, acid corrosion creates iron compounds such as iron chlorides. These iron compounds may precipitate, especially if sulfur or sulfides are present, and may interfere with the stability or effectiveness of other components of the fluid, thus requiring addition of iron control agents or iron sequestering agents to the fluid.

Second, if, as is usually the case, the intention is to use the acid to treat parts of the formation at a significant distance away from the wellbore (usually in addition to treating parts of the formation nearer the wellbore), this may be very difficult to accomplish because if an acid is injected from the surface down a wellbore and into contact with the formation, the acid will naturally react with the first reactive material with which it comes into contact. Depending upon the nature of the well and the nature of the treatment, this first-contacted and/or first-reacted material may be a filtercake, may be the formation surface forming the wall of an uncased (or openhole) wellbore, may be the near-wellbore formation, or may be a portion of the formation that has the highest permeability to the fluid, or is in fluid contact with a portion of the formation that has the highest permeability to the fluid. In many cases, this may not be the formation (matrix) material with which the operator wants the acid to react. At best this may be wasteful of acid; at worst this may make the treatment ineffective or even harmful. In general, the higher the temperature the more reactive is the acid and the greater are the problems. This is usually a severe problem when at least some of the formation is carbonate, which is typically very reactive towards acid.

Third, even when the acid has successfully been contacted with the desired region of the fracture face, there is sometimes a tendency for the acid to react evenly with the fracture faces, especially in localized regions, so that conductive channels along the fracture faces are not created by differential etching in such regions after fracture closure. This is most likely to occur when the rate of delivery of the acid to the reactive site (e.g. the fluid injection rate) is much lower than the rate of reaction of the acid.

There are several ways in which operators have dealt with these problems in the past. One method is to segregate the acid from the material with which reaction is not desired (such as wellbore metals or a near-wellbore reactive region of the formation). This is done, for example, by a) placing the acid in the internal phase of an emulsion (so-called "emulsified acid") and then either causing or allowing the emulsion to invert at the time and place where reaction is desired or allowing slow transport of the acid across the phase boundaries, or b) encapsulating the acid, for example by the method described in U.S. Pat. No. 6,207,620, and then releasing the acid when and where it is needed. There are problems with these methods. Although emulsified acids are popular and effective, they require additional additives and specialized equipment and expertise, and may be difficult to control. A problem with the encapsulated acids is that the location and timing of release of the acid may be difficult to control. The release is brought about by either physical or chemical degradation of the coating. Physical damage to the encapsulating material, or incomplete or inadequate coating during manufacture, could cause premature release of the acid.

A second method is to delay formation of the acid. Templeton, et al., in "Higher pH Acid Stimulation Systems", SPE paper 7892, 1979, described the hydrolysis of esters such as methyl formate and methyl acetate as in situ acid generators in the oilfield. They also described the reaction of ammonium monochloroacetic acid with water to generate glycolic acid and ammonium chloride in the oilfield. However, these acid precursors are liquids, and these reactions may take place rapidly as soon as the acid precursors contact water. A third method of encouraging differential etching is to fracture with a viscous non-acidic fluid and then to cause a less-viscous acid to finger through the viscous fluid.

There is a need for a method for acid fracturing of sandstones while minimizing the contact of acid with wellbore metals, minimizing contact of acid with the near wellbore formation early in the fracturing process, and creating highly conductive fractures along as much of the fracture length as possible; there is also a need for a solid non-acidic material that can be taken to a job site, added to water to produce a nearly neutral pH fluid slurry, and injected to provide the above results.

SUMMARY OF EMBODIMENTS OF THE INVENTION

One embodiment is a water-free composition that contains particles of a solid acid-precursor and particles of a solid that releases hydrogen fluoride in the presence of aqueous acid. Examples of the solid acid-precursor are lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of these materials. The solid acid-precursor may be encapsulated or may be coated with an effective amount of a material that slows hydrolysis of the solid acid-precursor when it is contacted with an aqueous fluid. Examples of the solid that releases hydrogen fluoride in the presence of aqueous acid are ammonium fluoride, ammonium bifluoride, polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON™ synthetic resinous fluorine-containing polymer, and mixtures of these. The solid that releases hydrogen fluoride may be encapsulated or may be coated to slow the release of hydrogen fluoride. Optionally, the particles of the solid acid-precursor and the particles of the solid that releases hydrogen fluoride in the presence of aqueous acid may have two or more than two different sizes, shapes, surface areas, and/or hydrolysis rates.

In another embodiment, the composition also contains particles of an inert solid. Examples of the inert solid particles include plastic, glass, polyacrylamide, phenol formaldehyde polymer, nylon, wax, natural rubber, synthetic rubber, vermiculite, organic seeds, organic shells, mica, cellophane flakes, starch, rock salt, benzoic acid, metals, naphthalene, and mixtures of these. The amount of inert particles may be varied during a job.

Another embodiment is an aqueous fluid containing a solid acid precursor and a solid that releases hydrogen fluoride in the presence of aqueous acid. The fluid is optionally buffered to a pH of 6.0 or greater, and optionally contains inert solid particles and/or a viscosifying agent.

Yet another embodiment of the invention is a method of creating a fracture in a subterranean formation penetrated by a wellbore in which a fluid containing a solid acid precursor and a solid that releases hydrogen fluoride in the presence of aqueous acid is injected above fracture pressure, and at least a portion of the solid acid-precursor is allowed to hydrolyze. The fluid is optionally buffered to a pH of 6.0 or greater, and optionally contains inert solid particles and/or a viscosifying agent. The injection step is optionally preceded by injection of a fluoride-free acidic pad that may contain a viscosifying agent, ammonium chloride, and/or acid.

DETAILED DESCRIPTION OF EMBODIMENTS OF THE INVENTION

Figure 1:
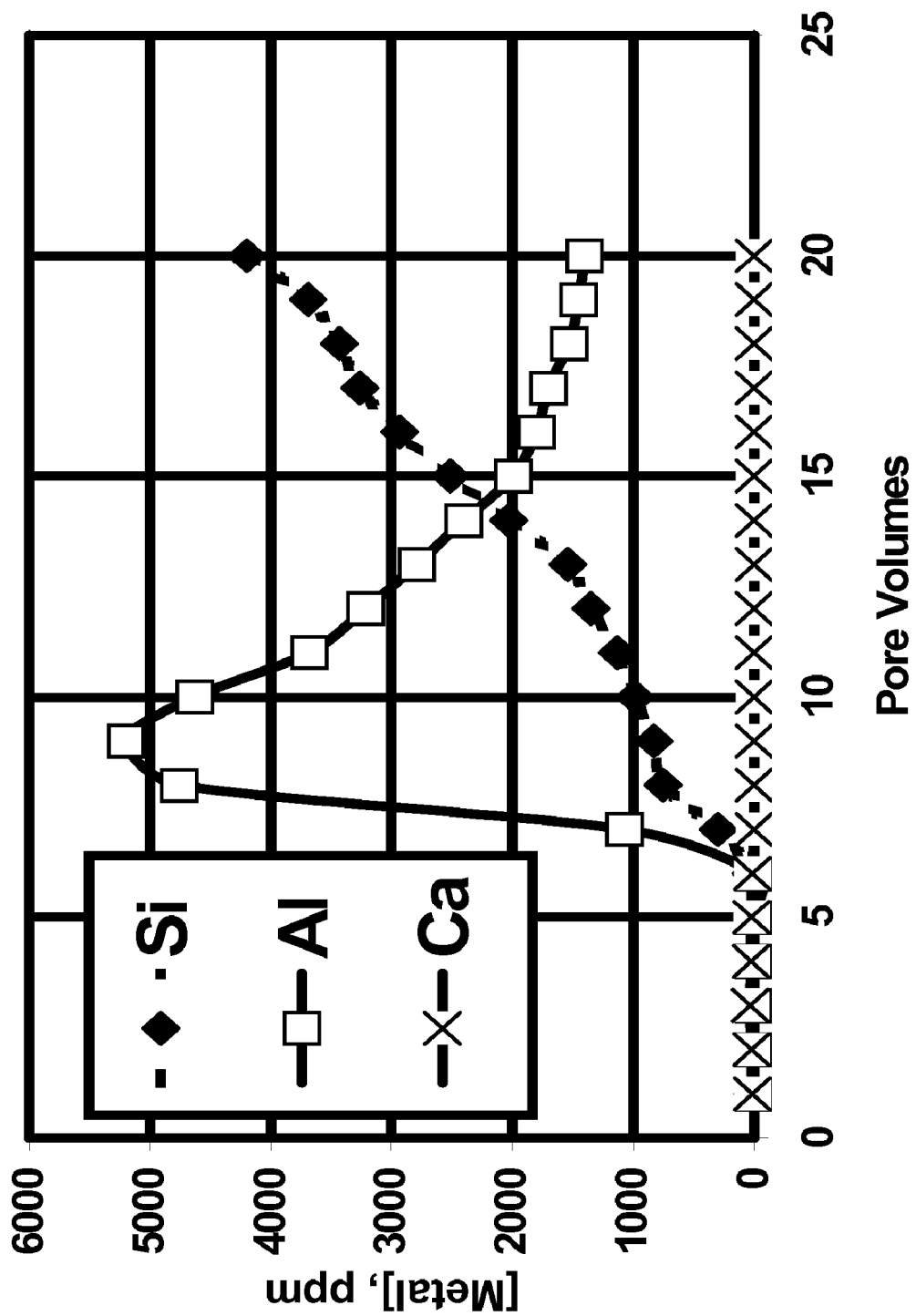
FIG. 1 shows the metals in the effluent of a sandstone core treated with an acid and a solid hydrogen fluoride source.

It has been discovered that a water-free mixture of particles of a solid acid-precursor and particles of a solid hydrogen fluoride source is a convenient additive that may be blended with an aqueous fluid to provide a slurry suitable for acid fracturing, particularly of sandstones. The generation of significant sandstone-dissolving capacity is delayed even after the slurry is first made, and the heterogeneity of the system results in non-uniform etching of the created fracture faces. Optionally, particles of an inert material may be added to mask portions of the fracture faces to increase the local disparity in the extent of etching. The solid acid-precursor is for example a dimer, oligomer, or polymer of certain acids that slowly hydrolyses and dissolves to release the acid. The solid hydrogen fluoride source may be soluble in water (such as ammonium fluoride or ammonium bifluoride) or insoluble in water (such as polyvinylammonium fluorides, polyvinylpyridinium fluorides, pyridinium fluorides, and imidazolium fluorides, sodium tetrafluoroborate, ammonium tetrafluoroborate, TEFLON™ synthetic resinous fluorine-containing polymer, and salts of hexafluoroantimony). Either way, the solid hydrogen fluoride source releases hydrogen fluoride only in the presence of acid. Until the solid acid precursor begins to hydrolyze and release acid, no hydrogen fluoride is released. For simplicity, after acid and hydrogen fluoride have been released, the fluid will be called an HF solution. The release of hydrogen fluoride may optionally be slowed in several ways. Boric acid may be added, so that initially produced HF reacts to form fluoboric acid, which then slowly releases HF to the fluid. A base or buffer may be added either to slow the hydrolysis/dissolution of the solid acid-precursor or to slow the release of hydrogen fluoride from the hydrogen fluoride source. The solid that releases hydrogen fluoride may be coated (here we include encapsulation in the meaning of coating) to slow the release of hydrogen fluoride.

In embodiments of the invention in which inert particles are present, the HF solution is not allowed to react with some portions of the fracture face, while still reacting with, and etching, other portions of the fracture face. During the treatment, a portion of the fracture face is protected from acid dissolution by placing a barrier or mask over a portion of the fracture face. This process of masking the formation (similar to the process performed during photolithography) protects a portion of the fracture face from dissolution and ultimately leaves behind a supporting "pillar" that acts something like the proppant in hydraulic fracturing and helps to keep the fracture open. The dissolving system removes some rock from any portion of one or both fracture faces that is not protected by the masking material (or by not-yet-dissolved solid acid-precursor or solid hydrogen fluoride source, if the latter is present). With a balance of masked and un-masked areas along the fracture face, a highly conductive pathway is created using the supporting pillars to hold open the fracture in a method analogous to a "room and pillar" mine. This results in a conductive pathway even if the fluid flow and reaction rates are in one of the regimes in which the dissolution of the fracture face would otherwise be comparatively uniform. The masking particles also serve as a fluid loss additive to reduce the volume of fracturing/dissolving fluid needed. The solid acid-precursor and the solid hydrogen fluoride source serve as masking agents until they dissolve. Some solid hydrogen fluoride sources do not fully dissolve.

The masking material will be termed "inert" if it is eventually dissolved by the hydrogen fluoride solution (or by other later-injected fluids or by formation fluids) but mostly or entirely at a time longer than the time during which the hydrogen fluoride solution is actively dissolving the formation. The masking material will be termed "permanently inert" if it is not dissolved by the hydrogen fluoride solution (or by other later-injected fluids) for a time at least as long as the fracture is useful (for example is part of an injection or production flow path), without remediation. The term "inert" will be used here to mean both "inert" and "permanently inert" unless specified otherwise. The masked, unreacted, localities are truly pillars if they extend entirely across the width of the resulting fracture (i.e. substantially matching fracture faces contact one another or are separated only by inert particles). This is the case as long as not all of the mask has dissolved and some is trapped between the fracture faces or if the fracture faces move toward one another after the mask is gone but the mask had already resulted in less or no reaction of the fracture faces where the mask had been located. If most or all of the mask dissolves but the fracture faces do not move toward one another after the mask dissolves (e.g. the motion has already occurred), the portion of the fracture face where the mask had been is narrower than portions that had not been masked, but that portion still contributes to the flow path. Whether an inert or permanently inert material is used depends upon many factors, including but not limited to the costs and availability of masking materials, how hard or soft the formation is, how hard or soft the masking material is, how large a flow path is needed, and the likelihood of fines migration.

Excellent solid acid-precursors are the solid cyclic dimers, or solid polymers, of certain organic acids, that hydrolyze under known and controllable conditions of temperature, time and pH to form the organic acids. One example of a suitable solid acid-precursor is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of glycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters.

Cargill Dow, Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™ PLA. The PLA's currently available from Cargill Dow have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature; it can also be accelerated of course by adding sufficient acid or base to a slurry, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze. This will still be termed hydrolysis/dissolution.

Other materials suitable as solid acid-precursors are those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355.

The solid acid-precursors may be manufactured in various solid shapes, including, but not limited to fibers, beads, films, ribbons and platelets. The solid acid-precursors may be coated to slow hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acid-precursors by any means delays the hydrolysis. Note that coating here may refer to encapsulation or simply to changing the surface by chemical reaction or by forming or adding a thin film of another material. See below for a further discussion of encapsulation. The hydrolysis and acid-release do not occur until water contacts the solid acid-precursor.

Solid hydrogen fluoride sources are not normally components of injected fluids used in sandstone acid fracturing treatments. However, they are useful in the present invention. (Materials are considered solid hydrogen fluoride sources if they are substantially insoluble or only slightly or slowly soluble in basic or approximately neutral aqueous fluids; in acidic aqueous fluids, they release hydrogen fluoride and may optionally slowly dissolve, completely or in part.) In addition to the effect of the inert material of the invention, the rate of dissolution of a portion of the sandstone fracture face depends upon whether or not that portion is in contact with a solid hydrogen fluoride source if it is present. (The dissolution rate depends upon the relative rates of the release of hydrogen fluoride from the solid, the diffusion or convection of hydrogen fluoride from the solid particle to the formation fracture face, and the reaction of hydrogen fluoride with the formation fracture face.) Therefore, there are areas of the fracture face that are dissolved at three different rates: the area in contact with the inert solid, the area in contact with the solid hydrogen fluoride source, and the area in contact with neither.

Examples of such solid hydrogen fluoride sources are polyvinylammonium fluorides, polyvinylpyridinium fluorides, pyridinium fluorides, and imidazolium fluorides, sodium tetrafluoroborate, ammonium tetrafluoroborate, salts of hexafluoroantimony, TEFLON™ synthetic resinous fluorine-containing polymer, and mixtures of these. Again, the masking effect is achieved by the as-yet-undissolved solid hydrogen fluoride source and/or with inert solids. The carrying fluid contains organic acids from the solid acid-precursor and an optional gelling agent. The organic acid in the carrying fluid has very low reactivity toward the sandstone rock. Dissolution reactions take place only upon release of hydrogen fluoride from the solid hydrogen fluoride source.

In water-free solid particle composition embodiments of the invention, the solid acid-precursor and the solid hydrogen fluoride source preferably do not contain free water or free acid. Manufactured materials obtained containing free water or free acid are dried (by methods that do not cause them to melt) before blending.

In embodiments of the invention, the preferred source of hydrogen fluoride is ammonium bifluoride, although others sources of hydrogen fluoride may be used, such as ammonium fluoride and HF. In dry solid mixture embodiments it is preferred that each be dust-free to protect personnel. It should be noted that each is very soluble in water. Ammonium fluoride in water is slightly acidic (a 1% solution has a pH of about 6.5); ammonium bifluoride in water is somewhat more acidic (a 5% solution has a pH of about 3.5). When the hydrogen fluoride source is ammonium bifluoride, it is present in the final slurry in an amount between about 0.5 and about 20 weight per cent, preferably between about 1 and about 10, most preferably between about 1 and about 5. When the hydrogen fluoride source is ammonium fluoride, it is present in the final slurry in an amount between about 0.3 and about 30 weight per cent, preferably between about 0.6 and about 20, and most preferably between about 0.6 and about 10. If a slurry is to be made and not injected immediately or if generation of HF downhole is to be delayed until the fracture has been created, an appropriate amount of a base or a buffer may be added to the dry solid mixture or to the aqueous fluid or to the slurry; HF is not generated until acid from the solid acid-precursor has neutralized the base or overwhelmed the buffer. Suitable materials, the choice of which depends upon the chemistry of the other solids and on the situation, can readily be determined by simple laboratory experiments; examples are ammonium, monoalkyl ammonium, dialkyl ammonium, and trialkyl ammonium or alkali metal carbonates or bicarbonates.

Either the solid acid-precursor or the solid hydrogen fluoride source may be encapsulated in order to delay generation of HF until the slurry has been placed in the fracture. Encapsulation materials and methods are well known in the art; encapsulated materials may be released by dissolution or by crushing of the capsule or by rupture due to entry of liquid. As has been said, in one embodiment the mixture of solid acid precursor and particles of a solid that releases hydrogen fluoride in the presence of an acid is provided as a dry mixture. In another embodiment the mixture is provided as a slurry in a hydrocarbon such as mineral oil, diesel or a mutual solvent. In another embodiment, either of the components is provided as such a slurry. When any component is provided as a slurry, that component is still coated with hydrocarbon when the component is added to water. This coating slows reaction of the component with water.

A masking agent is chosen that is suitably inert in the HF solution (and does not excessively interfere with its efficacy). Inert particles may be provided in various shapes, including, but not limited to fibers, beads, films, ribbons, platelets and mixtures of these shapes. If a mixture is used, the particle sizes and shapes of the individual components (solid acid-precursor, solid hydrogen fluoride source, inert material) of the mixture may be the same or different. Mixtures of inert particles and permanently inert particles may be used. Almost any particle size may be used. Governing factors include a) the capability of equipment, b) the width of the fracture generated, and c) the desired rate and time of formation dissolution. Preferred sizes are approximately those of proppants and fluid loss additives since operators have the equipment and experience suitable for those sizes. Particle sizes may be uniform or may be broadly heterogeneous. The total concentration in the slurry and the solid particle mixture chemical and physical composition may each or both be varied during injection.

In one embodiment, excellent particles used to create the masking area are soft deformable materials such as (but not limited to) soft plastic, wax, natural or synthetic rubber, vermiculite, organic seeds or shells, polyacrylamide, phenol formaldehyde polymer, nylon, starch, benzoic acid, metals or naphthalene. These materials conform to one or both fracture faces after they deform, even if they are initially in the form of beads. The deformation of the masking material improves the efficiency of the masking process by creating a larger area of coverage upon fracture closure. The pressure of fracture closure squeezes the deformable particle into a flattened pancake material that ultimately covers and protects a larger area of the fracture face. Such soft deformable masking materials are often not permanently inert and tend to degrade and completely break down overtime. This minimizes plugging or impairment of the fracture flow capacity after a job has been completed.

Sheet materials or particles having a very large aspect ratio (i.e. mica, cellophane flakes, etc.) are also effective because they cover a relatively large area of the fracture face. If these materials are much less thick than the fracture is wide, they are effective only on one face of the fracture and therefore provide only roughly half of the total supported fracture width. For these materials to conform to a fracture face, either they are flexible or the particles have length and width dimensions that are small relative to the initial fracture face asperity. Operationally, materials having this shape may be difficult to use due to placement issues during pumping.

Particles of non-deformable materials (such as glass, mica and salts) are preferably in shapes that allow large areas of the particles to conform to the fracture faces. Appropriate shapes include sheets and flakes. Spherical beads of non-deformable materials, such as conventional sand and ceramic proppants, may not be as suitable because they contact very little fracture face area. (Normally proppant is not used in acid fracturing, although it can be and such use would be within the scope of the invention.)

In another embodiment, in order to create large pillar structures, it may be desirable to pump slugs of inert particles with the solid acid-precursor/solid hydrogen fluoride source so as to have the masking particles create large supporting pillars. That is, the concentration of inert masking particles in the fracturing fluid may be varied during the treatment and may even be zero during part of the treatment. Similarly, especially if the solid hydrogen fluoride source is at least substantially insoluble, the total concentration of the solid acid-precursor/solid hydrogen fluoride source in the slurry may be varied during the treatment.

It is also within the scope of the Invention to manufacture particles that contain any two or all three of the solid acid-precursor, the solid hydrogen fluoride material, and the inert material, for example to form (for example co-extrude) and optionally then to comminute mixtures in beads, particles, fibers, platelets, sheets or ribbons. A binder may be used to facilitate this process.

Acid fracturing treatments are optionally conducted in a manner analogous to cost-minimization water fracs in which a low concentration, for example about 0.05 kg/L (weight of dry particulate in liquid), of slurried material is pumped at a high rate, for example up to about 3500 L/min or more, with little or no viscosifier. Optionally they are also conducted, as are more conventional fracturing treatments, with viscosifiers and higher concentrations of initially solid particles, for example up to about 0.6 kg/L, of a mixture. Suitable viscosifiers are the polymers or viscoelastic surfactants typically used in fracturing, frac-packing and gravel packing. The lower density of the solid acid-precursors and solid hydrogen fluoride sources, and of many types of inert particles, relative to the density of conventional proppants, is an advantage since the amount of viscosifier needed is less or none. Acid usually also acts as a breaker for the viscosifier, thus enhancing cleanup and offsetting any damage that might otherwise be done by the viscosifier. (Given time, acids are known to damage or destroy many synthetic polymers and biopolymers used to viscosify drilling, completion and stimulation fluids. Acids are also known to damage or destroy either the micelle/vesicle structures formed by many viscoelastic surfactants or, in some cases, the surfactants themselves.) In one embodiment, at least a portion of one of the solids in the mixture is in the form of fibers. Fibers are known to assist in the transport of more spherical particles, reducing or eliminating the need for viscosification.

The amount of masking particles (inert or not-yet-dissolved) used per unit area of fracture to be created depends upon, among other factors, the mechanical properties of the formation, the width of the etched fracture, the width and height of the hydraulic fracture, the fluid leakoff rate, the viscosity of the carrier fluid, and the density of the particles. With a balance of masked and un-masked areas along one or both fracture faces, a highly conductive pathway is created using the supporting pillars to hold open the fracture in a method analogous to a "room and pillar" mine. The preferred concentration range in the slurry is between about 0.42 and about 5 ppg (between about 0.05 and about 0.6 kg/L). The most preferred range is between about 0.83 and about 2.5 ppg (between about 0.1 and about 0.3 kg/L). Care must be exercised to prevent bridging (screening out) of any solid material unless it is desired at some point; one skilled in the art will know that for a given particle shape, flow rate, rock properties, etc. there is a concentration, that can be calculated by one of ordinary skill in the art, above which bridging may occur.

For sandstone treatment, as is known in the art, if the formation contains any carbonate it is common to pretreat (preflush) the formation with an acid such as hydrochloric acid to dissolve the carbonate and then, if necessary, inject a spacer such as ammonium chloride to push dissolved materials away before injection of the fluoride-containing fluid so that fluoride ion does not contact cations such as sodium, aluminum, calcium and magnesium which could precipitate. Chelating agents for cations such as aluminum, calcium and magnesium may be added to any of the fluids or mixtures of the invention. If the dissolution agent contains sufficient chelating agent, the preflush may not be necessary. A typical embodiment for creating differential etching with partial fracture surface masking involves pumping of a mixture containing an inert masking material, an inorganic or organic acid, a fluoride containing chemical and an optional viscosifying agent into a sandstone reservoir at above fracturing pressure.

Although it is usually not necessary, the sandstone acid fracturing fluid embodiments may contain corrosion inhibitors. Conventional corrosion inhibitors may be used as long as they are compatible with chemicals present in, or generated during use by, the slurry. Compounds containing ammonium quaternary moieties and sulfur compounds are suitable (see for example U.S. Pat. No. 6,521,028). Sandstone acid fracturing fluid embodiments of the invention may also contain many other additives commonly used in oilfield treatment fluids, such as clay control additives, viscosifiers, wetting agents, fluid loss additives, emulsifiers, agents to prevent the formation of emulsions, and foaming agents. It is to be understood that whenever any additives are included, laboratory tests should be performed to ensure that the additives do not affect the performance of the fluid.

Typically in fracturing treatments, injection of a fluid ahead of the main treatment fluid is employed to create width. A pad is generally used in the present invention to ensure that the fracture is wide enough for the solids in the main fluid to enter, but optionally the operator may omit the pad stage and put the solids into the main fluid provided that the fluid has sufficient viscosity to create width and to suspend the masking material. The pad may be any viscous fluid, as examples polymer, crosslinked polymer, VES, and foam, and may itself comprise a formation dissolving material or a clay control agent.

For sandstone treatment, as is known in the art, if the formation contains any carbonate it is common to pretreat (preflush) the formation with an acid such as hydrochloric acid to dissolve the carbonate and then, if necessary, inject a spacer such as ammonium chloride to push dissolved materials away before injection of the fluoride-containing fluid so that fluoride ion does not contact cations such as sodium, calcium and magnesium which could precipitate. If the fluid contains sufficient chelating agent, the preflush may not be necessary. If the fluid contains sufficient source of an acid that chelates these ions, such as lactic acid, when it contacts fluids or solids that contain these ions, the preflush may not be necessary.

The solid composition embodiments of the invention are made from at least one solid acid-precursor, at least one solid hydrogen fluoride source, and optionally at least one inert masking material. Each of these components may be approximately homogeneous (approximately a single size and shape) or heterogeneous (more than one size and/or shape or a distribution of sizes and/or shapes). All of the different solid components (including different sizes and/or shapes of a single material) may be individually manufactured, stored, transported to a job site, and added in any order to an aqueous fluid to make a fracturing fluid slurry that is then injected into a well. Optionally, any combination of two or more of the solid components may be combined in manufacture so that individual particles contain more than one type of solid. Optionally, any combination of two or more of the different solid components may be pre-mixed at any point during manufacture, transportation, and storage, or on the job site before preparation of the slurry. The slurry may be batch mixed or mixed on-the-fly, although the latter is preferred.

Acid fracturing is typically undertaken to provide improved flow paths for the production of hydrocarbons, but the method is equally useful in wells for the production of other fluids (such as water or helium) or for injection wells (for example for enhanced oil recovery or for disposal).

EXAMPLE 1

Figure 2:
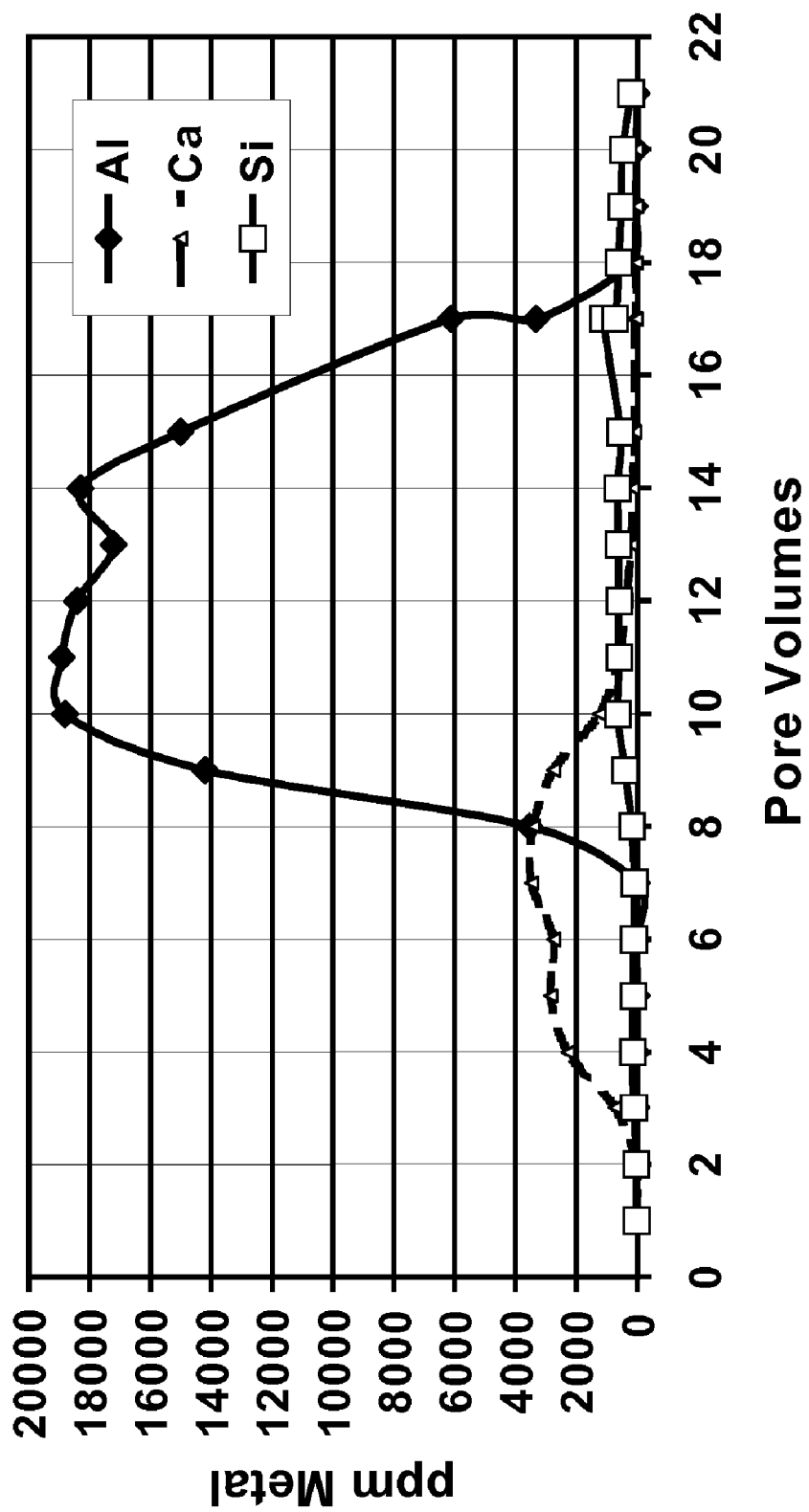
FIG. 2 shows the metals in the effluent of a sandstone core treated with an organic acid and mud acid.

To simulate the effects of acid fracturing with a slurry of polylactic acid and ammonium bifluoride, a fluid containing 10% lactic acid (the hydrolysis/dissolution product of polylactic acid) and 4% ammonium bifluoride was injected into a 2.5 cm by 15.2 cm Berea sandstone core at 350° F. (177° C.) at a flow rate of 2.5 ml/min with a confining pressure of 6.9 MPa and a back pressure of 10.3 MPa. FIG. 1 shows a plot of different metal concentrations measured in the effluent fluid as a function of the total fluid volume pumped during a single core flow experiment. The fluid was collected at the outlet of the core flow equipment and was analyzed by ICP. The steady increase in Si concentration is a clear indication that, in combination with a fluoride-containing fluid, the polylactic acid hydrolysis product dissolved a significant amount of silicates from the sandstone. For comparison, FIG. 2 shows the results when a fluid that was 10% acetic acid in 9/1 mud acid was pumped through a similar core. Not shown is that after the experiment with acetic acid and mud acid, the inlet face of that sandstone core was comparatively smooth; after the experiment with lactic acid and ammonium bifluoride, the inlet face of that sandstone core was much rougher.

EXAMPLE 2

Figure 3:
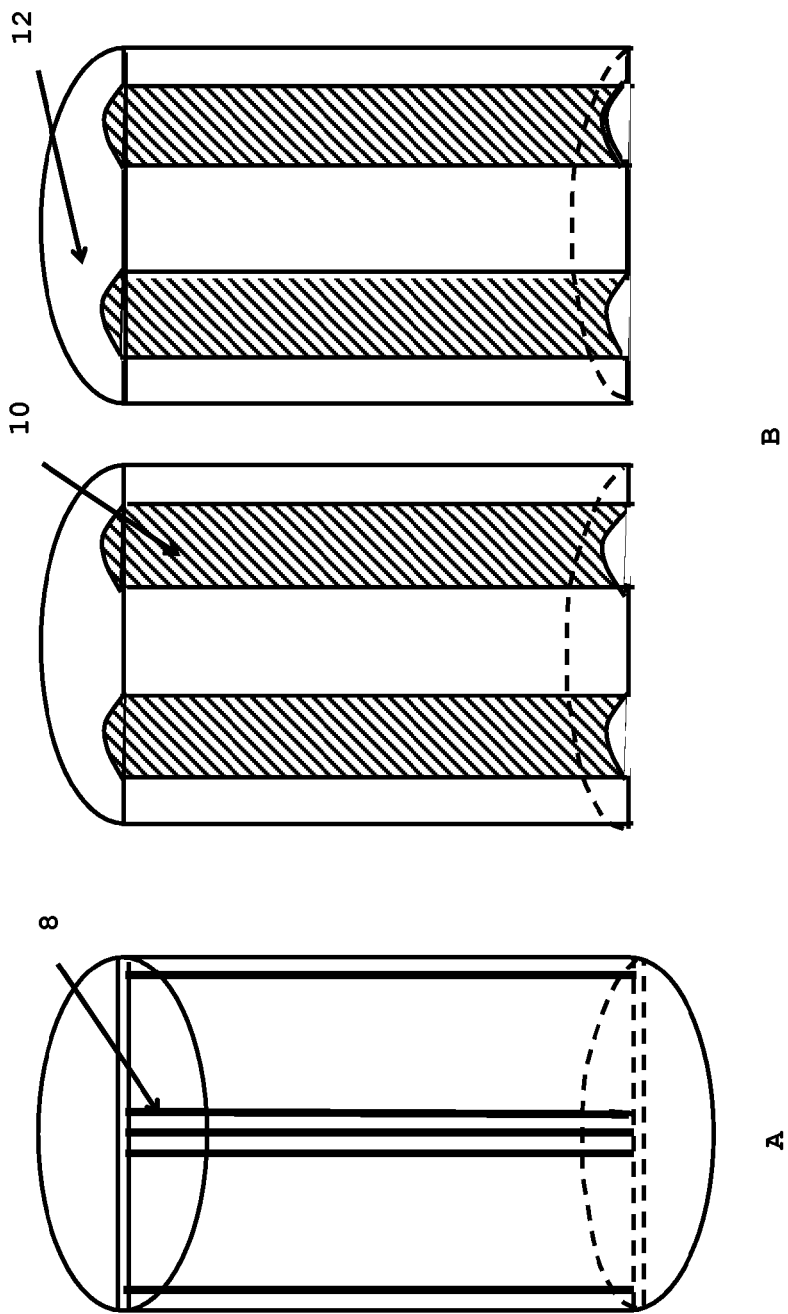
FIG. 3 shows the results of a core flow experiment that was conducted with an inert masking material.
Figure 4:
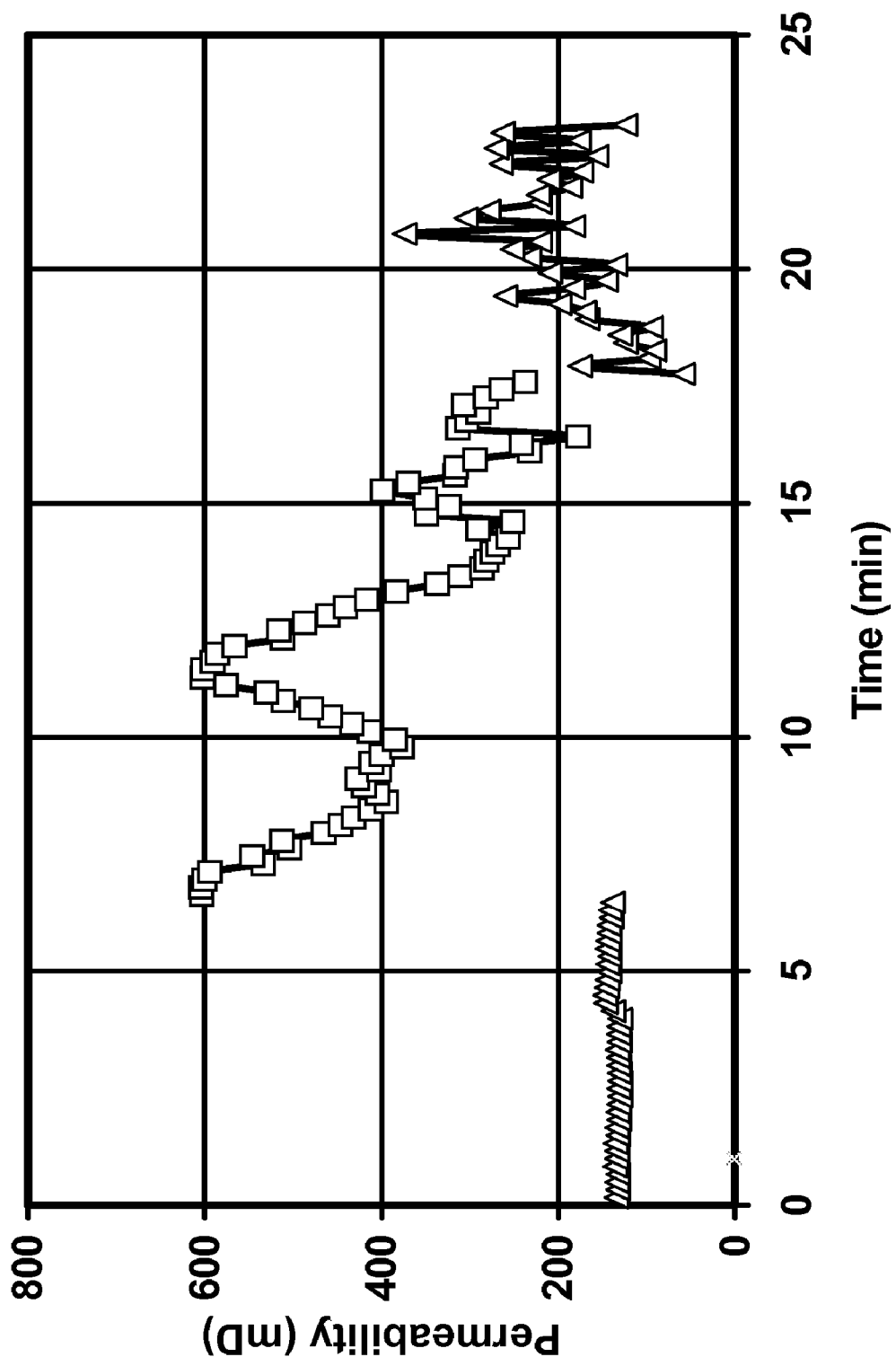
FIG. 4 shows the permeabilities observed in a core flow experiment that was conducted with an inert masking material.

FIGS. 3 and 4 show a core flow experiment in which a split sandstone core was used and the affect of inert masking material was simulated. FIG. 3A shows the core with masking material in place, and FIG. 3B shows the core after etching. The 2.5 cm ×15 cm inch core was cut in half along the core length; one half is shown as [12]. Teflon fibers [8] (about 0.08 cm×about 15 cm) were placed between the two pieces as shown in FIG. 3A. The pieces were then reassembled and loaded into a core holder, and a confining pressure of 13.8 MPa was applied. FIG. 4 shows the permeability when several fluids were injected into the gap between the two sandstone pieces in the core holder. A 5% ammonium fluoride solution was injected (triangles before about 7 min.) at a flow rate of 5 cc/min, then 12/6 mud acid at the same flow rate 9 squares), and then 5% ammonium fluoride again at the same flow rate (triangles after about 17.5 min.). The permeability was clearly higher after the treatment of this simulation of a partially masked core. After the experiment, the core halves were visually inspected and it was found that differential etching had occurred. FIG. 3 shows this schematically; region [10] shows the etched region. This masking material spread out under the confining pressure and covered more area than when it was placed, so the etched region in FIG. 3B had greater area than the unmasked region in FIG. 3A.

EXAMPLE 3

A typical acid fracturing job of the invention is pumped with a pad to initiate the fracture and to maintain the fracture width until the solids reach and fill the fracture. Optionally, the treating fluid with solids may be used to initiate and propagate the fracture. Once the fracture is initiated, a mixture of, for example, solid polylactic acid (PLA) particles and solid HF source particles is pumped to fill the volume of the fracture completely. Optionally, the solids content is ramped up to achieve the maximum amount of solids placement with a minimum probability of bridging. Typical loading for the solids is, for example, about 0.5 kg solids per L of fluid. After the fracture is created and the solids are placed, the well is optionally shut in to allow more complete hydrolysis of the solid acid precursor to occur. When the PLA hydrolyzes, lactic acid is formed. The lactic acid then initiates the release of hydrogen fluoride and the hydrogen fluoride concentration increases rapidly where the solid acid hydrogen fluoride source was present.

EXAMPLE 3

Figure 5:
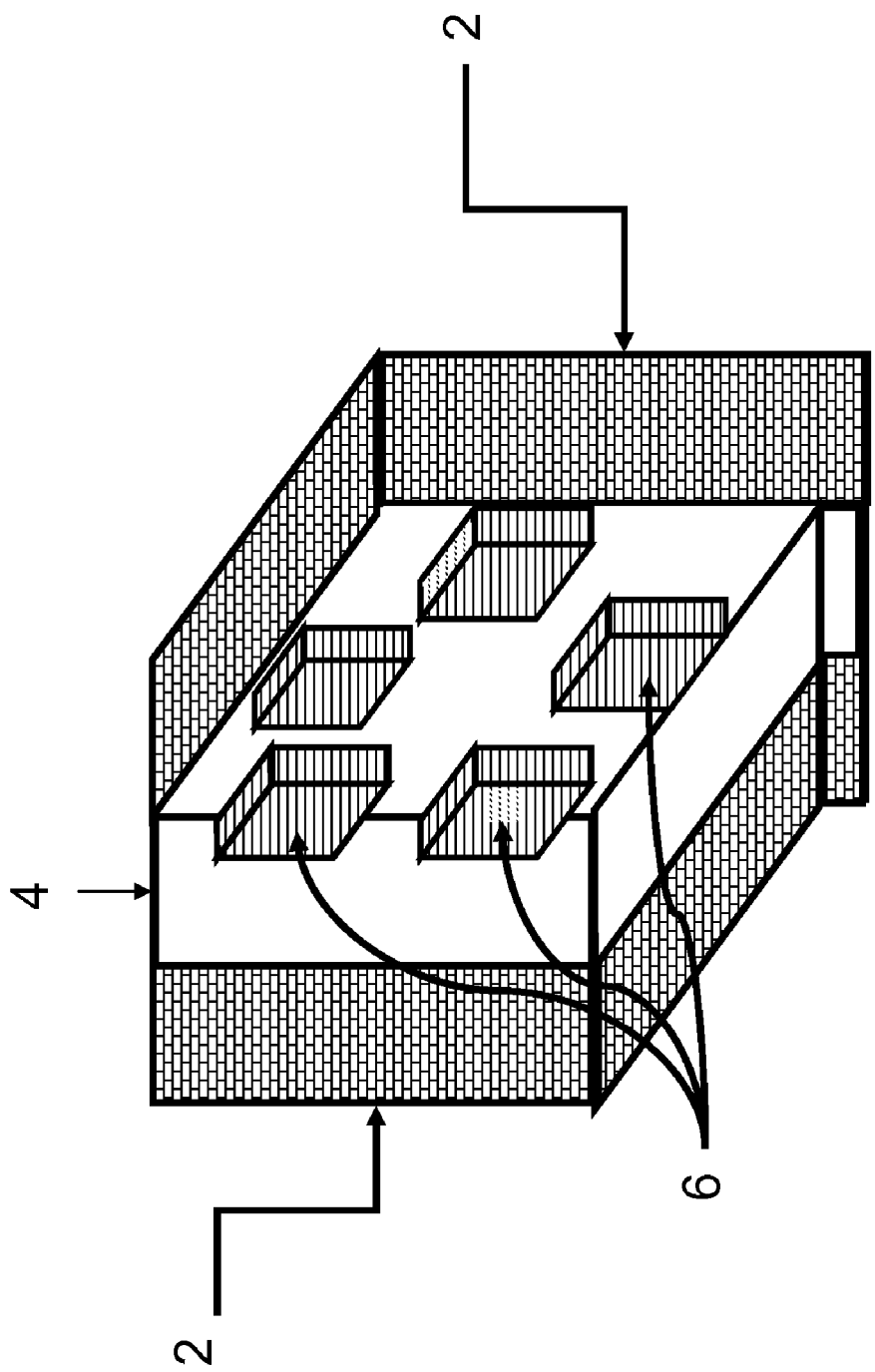
FIG. 5 shows a schematic of a fracture that is created with an inert masking material present.

FIG. 5 shows a schematic of how a fracture would appear if created by the method of the invention. The fracture [4] in the formation [2] contains regions [6] that are not open to fluid flow. These regions are where the inert or reactive masking material is trapped when the fracture closes. The fracture face is protected from the formation dissolving agent at those locations.

What is claimed is:

1. A method of creating a fracture in a subterranean formation penetrated by a wellbore comprising:

a. preparing a fluid comprising a solid acid precursor and a solid that releases hydrogen fluoride in the presence of aqueous acid, said fluid further comprising inert particles in sufficient amount to form a masking material over portions of one or more fracture faces, creating a balance between masked areas and un-masked areas along the fracture face,
   b. injecting said fluid into said formation above fracture pressure, and
   c. allowing at least a portion of said solid acid-precursor to hydrolyze, and release hydrogen fluoride creating a dissolving system, said dissolving system removing rock from portions of one or both fracture faces that is not protected by the masking material,
   wherein said portions of fracture faces protected from dissolution create pillars between the fracture faces which hold open the fracture and create a highly conductive pathway.

2. The method of claim 1 wherein said fluid is buffered to a pH of 6.0 or greater.

3. The method of claim 1 wherein said fluid further comprises a viscosifying agent.

4. The method of claim 3 wherein said fluid is buffered to a pH of 6.0 or greater.

5. The method of claim 1 wherein said fluid further comprises a chelating agent for one or more than one of the ions selected from calcium, aluminum and magnesium.

6. The method of claim 1 wherein said step of injecting above fracture pressure is preceded by injection of a fluoride-free pad comprising a component selected from a dissolution agent and a clay control agent.

7. The method of claim 6 wherein said pad comprises a viscosifying agent.

8. The method of claim 1 wherein the solid that releases hydrogen fluoride is coated to slow the release of hydrogen fluoride.

9. The method of claim 8 wherein the solid that releases hydrogen fluoride is coated with hydrocarbon.

10. The method of claim 1 wherein the solid acid-precursor is coated with an effective amount of a material that slows hydrolysis of said solid acid-precursor when said solid acid-precursor is contacted with an aqueous fluid.

11. The method of claim 10 wherein the solid acid-precursor is coated with a hydrocarbon.

12. The method of claim 1 wherein all of said particles are permanently inert.

13. A method of creating a fracture in a subterranean formation penetrated by a wellbore comprising:

a. preparing a fluid comprising a solid acid precursor, particles of an inert solid, and hydrofluoric acid,
   b. injecting said fluid into said formation above fracture pressure, and
   c. allowing at least a portion of said solid acid-precursor to hydrolyze, forming a masking material over portions of one or more fracture faces, protecting said portions of fracture faces from dissolution, creating a balance of masked and un-masked areas along the fracture face,
   wherein said portions of fracture faces protected from dissolution create pillars between the fracture faces which hold open the fracture and create a highly conductive pathway.

14. The method of claim 13 wherein all of said particles are permanently inert.

15. The method of claim 13 wherein said inert particles comprise a mixture of inert and permanently inert particles.

* * * * *